(12) United States Patent
McCloud et al.

(10) Patent No.: US 10,919,579 B2
(45) Date of Patent: Feb. 16, 2021

(54) COMPOSITE FLOOR STRUCTURE WITH EMBEDDED HARDPOINT CONNECTOR AND METHOD OF MAKING THE SAME

(71) Applicant: Wabash National, L.P., Lafayette, IN (US)

(72) Inventors: Travis S. McCloud, Cadiz, KY (US); Ronnal P. Reichard, Melbourne, FL (US); Andrzej Wylezinski, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 63 days.

(21) Appl. No.: 16/111,726

(22) Filed: Aug. 24, 2018

(65) Prior Publication Data

US 2019/0061832 A1 Feb. 28, 2019

Related U.S. Application Data

(60) Provisional application No. 62/550,311, filed on Aug. 25, 2017.

(51) Int. Cl.
*B62D 25/20* (2006.01)
*B62D 53/08* (2006.01)

(52) U.S. Cl.
CPC ..... *B62D 25/2054* (2013.01); *B62D 53/0842* (2013.01)

(58) Field of Classification Search
CPC .... B62D 25/2054; B62D 33/02; B62D 53/08; B62D 53/0842; B62D 53/06
USPC ....................... 296/184.1; 280/433
See application file for complete search history.

(56) References Cited

U.S. PATENT DOCUMENTS

| | | | | |
|---|---|---|---|---|
| 2,841,415 | A | * | 7/1958 | Black ................... B62D 29/02 280/423.1 |
| 3,003,810 | A | * | 10/1961 | Kloote ................ B62D 33/048 296/181.3 |
| 3,557,992 | A | | 1/1971 | Reeves |
| 3,598,421 | A | * | 8/1971 | Mason, Jr. ......... B62D 25/2054 280/423.1 |
| 3,637,252 | A | | 1/1972 | Metsker |
| 3,738,678 | A | * | 6/1973 | King ................. B62D 25/2054 52/656.8 |
| 4,226,465 | A | * | 10/1980 | McCullough ......... B60P 7/0807 105/414 |

(Continued)

FOREIGN PATENT DOCUMENTS

| | | |
|---|---|---|
| AU | 713260 | 11/1999 |
| CA | 1329818 | 5/1994 |

(Continued)

OTHER PUBLICATIONS

Black Sara "Structural adhesives Part I: Industrial" CompositesWorld posted Apr. 11, 2016 7 pages.

(Continued)

*Primary Examiner* — Gregory A Blankenship
(74) *Attorney, Agent, or Firm* — Faegre Drinker Biddle & Reath LLP

(57) ABSTRACT

A cargo vehicle is disclosed having a composite floor assembly with at least one embedded hardpoint connector. The embedded connector may be used to securely couple other vehicle components to the composite floor assembly, such as a coupler assembly with a king pin.

13 Claims, 7 Drawing Sheets

(56) References Cited

U.S. PATENT DOCUMENTS

| | | | |
|---|---|---|---|
| 4,418,507 A | 12/1983 | Roberts et al. | |
| 4,685,720 A | 8/1987 | Oren | |
| 4,758,299 A | 7/1988 | Burke | |
| 4,838,605 A * | 6/1989 | Abromavage | B62D 25/2054 |
| | | | 105/422 |
| 4,976,490 A | 12/1990 | Gentle | |
| 5,351,990 A * | 10/1994 | Thomas | B62D 25/2054 |
| | | | 280/789 |
| 5,403,063 A | 4/1995 | Sjostedt et al. | |
| 5,417,453 A * | 5/1995 | VanDenberg | B62D 21/03 |
| | | | 280/785 |
| 5,429,066 A | 7/1995 | Lewit et al. | |
| 5,507,405 A | 4/1996 | Thomas | |
| 5,562,981 A | 10/1996 | Ehrlich | |
| 5,664,518 A | 9/1997 | Lewit et al. | |
| 5,700,118 A | 12/1997 | Bennett | |
| 5,765,639 A | 6/1998 | Muth | |
| 5,772,276 A | 6/1998 | Fetz et al. | |
| 5,800,749 A | 9/1998 | Lewit et al. | |
| 5,802,984 A | 9/1998 | Thoman | |
| 5,830,308 A | 11/1998 | Reichard | |
| 5,860,668 A | 1/1999 | Hull et al. | |
| 5,860,693 A | 1/1999 | Ehrlich | |
| 5,890,435 A | 4/1999 | Thoman | |
| 5,897,818 A | 4/1999 | Lewit et al. | |
| 5,908,591 A | 6/1999 | Lewit et al. | |
| 5,916,093 A | 6/1999 | Fecko | |
| 5,934,741 A * | 8/1999 | Beukers | B62D 29/046 |
| | | | 296/181.6 |
| 5,979,684 A | 11/1999 | Ohnishi | |
| 5,992,117 A | 11/1999 | Schmidt | |
| 6,004,492 A | 12/1999 | Lewit et al. | |
| 6,013,213 A | 1/2000 | Lewit et al. | |
| 6,076,693 A | 6/2000 | Reiter | |
| 6,082,810 A | 7/2000 | Bennett | |
| 6,092,472 A | 7/2000 | Thoman | |
| 6,199,939 B1 | 3/2001 | Ehrlich | |
| 6,206,669 B1 | 3/2001 | Lewit et al. | |
| 6,220,651 B1 | 4/2001 | Ehrlich | |
| 6,227,125 B1 | 5/2001 | Schroeder | |
| 6,247,747 B1 * | 6/2001 | Kawanomoto | B60J 5/0498 |
| | | | 296/191 |
| 6,270,150 B1 * | 8/2001 | Miller | B62D 21/17 |
| | | | 296/184.1 |
| 6,318,794 B1 | 11/2001 | Berube | |
| 6,349,988 B1 | 2/2002 | Foster | |
| 6,374,546 B1 | 4/2002 | Fecko | |
| 6,496,190 B1 | 12/2002 | Driemeyher et al. | |
| 6,497,190 B1 | 12/2002 | Lewit | |
| 6,505,883 B1 | 1/2003 | Ehrlich | |
| 6,543,469 B2 | 4/2003 | Lewit et al. | |
| 6,615,741 B2 | 9/2003 | Fecko | |
| 6,626,622 B2 | 9/2003 | Zubko | |
| 6,688,835 B1 | 2/2004 | Buher | |
| 6,723,273 B2 | 4/2004 | Johnson et al. | |
| 6,740,381 B2 | 5/2004 | Day et al. | |
| 6,745,470 B2 | 6/2004 | Foster et al. | |
| 6,755,998 B1 | 6/2004 | Reichard et al. | |
| 6,761,840 B2 | 7/2004 | Fecko | |
| 6,824,341 B2 | 11/2004 | Ehrlich | |
| 6,843,525 B2 | 1/2005 | Preisler | |
| 6,854,791 B1 | 2/2005 | Jaggi | |
| 6,863,339 B2 | 3/2005 | Bohm | |
| 6,869,561 B2 | 3/2005 | Johnson et al. | |
| 6,877,940 B2 | 4/2005 | Nelson | |
| 6,893,075 B2 | 5/2005 | Fenton et al. | |
| 6,911,252 B2 | 6/2005 | Lewit et al. | |
| 6,986,546 B2 | 1/2006 | Ehrlich | |
| 7,000,978 B1 | 2/2006 | Messano | |
| 7,025,166 B2 | 4/2006 | Thomas | |
| 7,025,408 B2 | 4/2006 | Jones et al. | |
| 7,069,702 B2 | 7/2006 | Ehrlich | |
| 7,134,820 B2 | 11/2006 | Ehrlich | |
| 7,182,396 B2 | 2/2007 | Taylor | |
| 7,219,952 B2 | 5/2007 | Taylor | |
| 7,264,305 B2 | 9/2007 | Kuriakose | |
| 7,353,960 B2 | 4/2008 | Seiter | |
| 7,407,216 B2 | 8/2008 | Taylor | |
| 7,434,520 B2 | 10/2008 | Zupancich | |
| 7,451,995 B2 | 11/2008 | Bloodworth et al. | |
| 7,461,888 B2 | 12/2008 | Brown | |
| 7,517,005 B2 | 4/2009 | Kuriakose | |
| 7,575,264 B1 | 8/2009 | Solomon | |
| 7,578,534 B2 | 8/2009 | Wuerfel, III | |
| 7,578,541 B2 | 8/2009 | Layfield | |
| 7,587,984 B2 | 9/2009 | Zupancich | |
| 7,588,286 B2 | 9/2009 | Lewallen | |
| 7,594,474 B2 | 9/2009 | Zupancich | |
| 7,608,313 B2 | 10/2009 | Solomon | |
| 7,621,589 B1 | 11/2009 | Gerome | |
| 7,704,026 B2 | 4/2010 | Roush | |
| 7,722,112 B2 | 5/2010 | Ehrlich | |
| 7,748,172 B2 | 7/2010 | Zupancich | |
| 7,762,618 B2 | 7/2010 | Lewallen | |
| 7,790,076 B2 | 9/2010 | Seiter | |
| 7,829,165 B2 | 11/2010 | Grandominico et al. | |
| 7,887,120 B2 | 2/2011 | Boivin | |
| 7,901,537 B2 | 3/2011 | Jones | |
| 7,905,072 B2 | 3/2011 | Verhaeghe | |
| 7,914,034 B2 | 3/2011 | Roush | |
| 7,931,328 B2 | 4/2011 | Lewallen | |
| 8,016,322 B2 | 9/2011 | Keehan | |
| 8,056,960 B2 | 11/2011 | Brown | |
| 8,118,345 B1 * | 2/2012 | Hootman | B62D 29/02 |
| | | | 296/184.1 |
| 8,186,747 B2 | 5/2012 | Bloodworth et al. | |
| 8,263,217 B2 | 9/2012 | Verhaeghe | |
| 8,342,588 B2 | 1/2013 | Skaradzinski | |
| 8,448,989 B2 | 5/2013 | Verhaeghe | |
| 8,474,171 B1 | 7/2013 | Ludwick | |
| 8,696,048 B2 | 4/2014 | Griffin et al. | |
| 8,757,704 B2 | 6/2014 | Zhao et al. | |
| 8,814,255 B2 | 8/2014 | Yamaji et al. | |
| 8,876,193 B2 | 11/2014 | Kunkel et al. | |
| 8,950,144 B2 | 2/2015 | Padmanabhan | |
| 9,051,014 B2 | 6/2015 | Lookebill et al. | |
| 9,138,943 B2 | 9/2015 | Weinberg | |
| 9,138,974 B2 | 9/2015 | Weinberg | |
| 9,138,975 B2 | 9/2015 | Weinberg | |
| 9,174,656 B2 | 11/2015 | Heitmeyer | |
| 9,199,440 B2 | 12/2015 | Weinberg | |
| 9,205,635 B2 | 12/2015 | Weinberg | |
| 9,260,117 B2 | 2/2016 | Vande Sands | |
| 9,339,987 B2 | 5/2016 | Weinberg | |
| 9,371,468 B2 | 6/2016 | Lewit | |
| 9,409,607 B2 | 8/2016 | Osten | |
| 9,434,421 B1 | 9/2016 | Lu | |
| 9,499,203 B1 | 11/2016 | Finley | |
| 9,566,769 B2 | 2/2017 | Weinberg | |
| 9,604,677 B2 | 3/2017 | McKinney | |
| 9,650,003 B2 | 5/2017 | Owens | |
| 9,708,009 B2 | 7/2017 | Vance | |
| 9,738,050 B2 | 8/2017 | Lee | |
| 9,744,753 B2 | 8/2017 | Sheffield | |
| 9,815,501 B2 | 11/2017 | McCormack | |
| 9,827,750 B2 | 11/2017 | Lookebill | |
| 9,828,164 B2 | 11/2017 | Denson | |
| 9,878,744 B2 | 1/2018 | Lu | |
| 9,884,660 B2 | 2/2018 | Fenton | |
| 9,884,661 B2 | 2/2018 | Fenton | |
| 9,889,637 B2 | 2/2018 | Weinberg | |
| 10,518,823 B1 * | 12/2019 | Childress | B60J 7/106 |
| 2001/0011832 A1 | 8/2001 | Ehrlich | |
| 2005/0168004 A1 * | 8/2005 | Vandewinckel | B62D 51/02 |
| | | | 296/26.12 |
| 2005/0194381 A1 | 9/2005 | Zupancich | |
| 2005/0241253 A1 | 11/2005 | Song et al. | |
| 2006/0065152 A1 | 3/2006 | Heitmeyer | |
| 2006/0099044 A1 * | 5/2006 | Johnson | B60P 7/0815 |
| | | | 410/97 |
| 2006/0108361 A1 | 5/2006 | Seiter | |
| 2006/0121244 A1 | 6/2006 | Godwin | |
| 2006/0123725 A1 | 6/2006 | Godwin | |

(56) References Cited

U.S. PATENT DOCUMENTS

| | | |
|---|---|---|
| 2006/0158005 A1 | 7/2006 | Brown |
| 2006/0179733 A1 | 8/2006 | Padmanabhan |
| 2006/0201081 A1 | 9/2006 | Godwin |
| 2006/0219129 A1 | 10/2006 | Jarvis |
| 2007/0069500 A1* | 3/2007 | Bloodworth ....... B62D 53/0842 280/433 |
| 2007/0119850 A1 | 5/2007 | Seiter |
| 2007/0132278 A1* | 6/2007 | Lester ................. B62D 29/048 296/191 |
| 2007/0160793 A1 | 7/2007 | Cageao |
| 2007/0194602 A1 | 8/2007 | Ehrlich |
| 2007/0216197 A1 | 9/2007 | Wuerfel, III |
| 2007/0250025 A1 | 10/2007 | Sams |
| 2008/0290057 A1 | 11/2008 | Zupancich |
| 2009/0126600 A1 | 5/2009 | Zupancich |
| 2009/0243335 A1* | 10/2009 | Messier ............ B62D 25/2054 296/184.1 |
| 2009/0278386 A1 | 11/2009 | Ehrlich |
| 2010/0019536 A1* | 1/2010 | Bloodworth ......... B62D 33/046 296/184.1 |
| 2010/0101876 A1 | 4/2010 | Misencik |
| 2010/0109309 A1 | 5/2010 | Kootstra |
| 2010/0264624 A1* | 10/2010 | McNeil ..................... C23C 2/02 280/433 |
| 2011/0089667 A1* | 4/2011 | Knollman ................ G01M 3/26 280/433 |
| 2011/0095574 A1 | 4/2011 | Brown |
| 2011/0204611 A1 | 8/2011 | Ziegler |
| 2013/0069340 A1* | 3/2013 | Goedken ............ B62D 53/0842 280/433 |
| 2013/0207413 A1 | 8/2013 | Lookebill et al. |
| 2014/0199551 A1 | 7/2014 | Lewit |
| 2014/0262011 A1 | 9/2014 | Lewit et al. |
| 2014/0300134 A1 | 10/2014 | Gerst |
| 2015/0054311 A1 | 2/2015 | Marchesano et al. |
| 2015/0076861 A1 | 3/2015 | Padmanabhan |
| 2015/0137560 A1 | 5/2015 | Presiler |
| 2015/0145281 A1* | 5/2015 | Gillin ..................... B62D 33/02 296/184.1 |
| 2015/0158532 A1 | 6/2015 | Ayuzawa |
| 2015/0203160 A1 | 7/2015 | Peterson et al. |
| 2015/0224835 A1* | 8/2015 | Ehrlich ............. B62D 53/0842 280/423.1 |
| 2015/0266516 A1* | 9/2015 | Williams ............... B65D 90/24 296/184.1 |
| 2016/0116213 A1* | 4/2016 | Dykes, Jr. ............... F26B 25/10 296/25 |
| 2016/0185403 A1* | 6/2016 | Wylezinski ............ B62D 53/06 280/423.1 |
| 2016/0304131 A1* | 10/2016 | Stanton .................. B62D 21/03 |
| 2017/0057561 A1 | 3/2017 | Fenton |
| 2017/0073022 A1* | 3/2017 | Gillin ..................... B62D 63/06 |
| 2017/0100972 A1* | 4/2017 | Pulliam .................. B60D 1/015 |
| 2017/0166263 A1 | 6/2017 | McKinney |
| 2017/0210317 A1 | 7/2017 | Owens |
| 2017/0240216 A1* | 8/2017 | Bauer ................... B62D 29/043 |
| 2017/0240217 A1* | 8/2017 | Storz .................... B62D 33/048 |
| 2017/0241134 A1* | 8/2017 | McCloud ............... B62D 33/02 |
| 2017/0247063 A1 | 8/2017 | Banerjee |
| 2017/0282499 A1 | 10/2017 | LaRocco |
| 2017/0334489 A1 | 11/2017 | Shin |
| 2018/0037151 A1 | 2/2018 | Bauer et al. |
| 2018/0057077 A1* | 3/2018 | Ehrlich ............. B62D 25/2054 |
| 2018/0154949 A1* | 6/2018 | Stockrahm ......... B62D 33/0207 |
| 2019/0047634 A1* | 2/2019 | McCloud .............. B32B 27/08 |
| 2019/0061832 A1* | 2/2019 | McCloud ............ B62D 25/2054 |
| 2019/0152546 A1* | 5/2019 | Jones .................. B62D 53/067 |
| 2019/0225286 A1* | 7/2019 | Schutt ..................... G01L 1/12 |
| 2020/0055549 A1* | 2/2020 | McCloud .............. B62D 33/04 |
| 2020/0070894 A1* | 3/2020 | McCloud .............. B62D 33/04 |
| 2020/0079438 A1* | 3/2020 | Keen ..................... B62D 33/02 |

FOREIGN PATENT DOCUMENTS

| | | |
|---|---|---|
| CA | 2181750 | 1/1997 |
| CA | 2199584 | 9/1997 |
| CA | 2253308 | 11/1997 |
| CA | 2551863 | 3/1998 |
| CA | 2219312 | 4/1998 |
| CA | 2242467 | 7/1999 |
| CA | 2261384 | 8/1999 |
| CA | 2265405 | 1/2000 |
| CA | 2275848 | 12/2000 |
| CA | 2382578 | 3/2001 |
| CA | 2455957 | 5/2004 |
| CA | 2768878 | 3/2005 |
| CA | 2811134 | 4/2006 |
| CA | 2529762 | 6/2006 |
| CA | 2650992 | 11/2006 |
| CA | 2528558 | 5/2007 |
| CA | 2565510 | 8/2007 |
| CA | 2604282 | 3/2008 |
| CA | 2689745 | 7/2009 |
| CA | 2689746 | 7/2009 |
| CA | 2689747 | 7/2009 |
| CA | 2689748 | 7/2009 |
| CA | 2689749 | 7/2009 |
| CA | 2689751 | 7/2009 |
| CA | 2797778 | 7/2009 |
| CA | 2802907 | 7/2009 |
| CA | 2788047 | 8/2011 |
| CA | 2763094 | 7/2012 |
| CA | 2848174 | 10/2014 |
| CA | 2894059 | 12/2015 |
| CA | 2807710 | 5/2016 |
| CA | 2977131 | 9/2016 |
| CA | 2958805 | 8/2017 |
| CA | 2958838 | 8/2017 |
| CA | 2958839 | 8/2017 |
| DE | 2617169 | 10/2013 |
| EP | 2660119 | 6/2013 |
| JP | 06293233 | 10/1994 |

OTHER PUBLICATIONS

CMS North America Inc. "Transportation: Refrigerated Semi-trailers Trailers & Vans" available online at http:www.cmsna.com13_transportation_refrigerated_semi_trailers_trailers_vans.php on or before Jul. 2, 2014 2 pages.

North American Composites Virtual Engineered Composites (VEC) Article available online at http:www.nacomposites.comdelivering-performancepage.asp?issueid=7&page=cover Fall 2006 4 pages.

Reichard Dr. Ronnal P. "Composites in Theme Parks: From the perspective of a contractor-trouble shooter-enthusiast!" presented at Florida Institute of Technology at least as early as 1999 37 pages.

Lightweight Structures B.V. "ColdFeather: lightweight composite isothermal trailer" available online at http:www.lightweight-structures.comcoldfeather-lightweight-composite-isothermal-trailerindex.html at least as early as Jun. 18, 2015 6 pages.

Expedition Portal "Truck Camper Construction Costs?" available online at http:www.expeditionportal.comforumthreads12486-Truck-Camper-Construction-Costs at least as early as Jun. 18, 2015 5 pages.

Griffiths Bob "Rudder Gets New Twist with Composites" CompositesWorld posted Aug. 1, 2006 4 pages.

Morey Bruce "Advanced Technologies Supplement: Processes Reduce Composite Costs" Advanced Manufacturing posted Apr. 1, 2007 7 pages.

NetCompositesNow.com "Twisted Composites Rudders" available online at http:www.netcomposites.comnewstwisted-composites-rudders3202 as early as Aug. 11, 2005 3 pages.

Eric Green Associates.com "Composite Rudders Take Shape for U.S. Navy" available online at http:www.ericgreeneassociates.comimagesComposite_Twisted_Rudder.pdf accessed as early as Jul. 13, 2014 7 pages.

Seaver Mark and Trickey Stephen "Underwater Blast Loading of a Composite Twisted Rudder with FBGS" dated Apr. 14, 2008 19th International Conference on Optical Fibre Sensors 2 pages.

(56) References Cited

OTHER PUBLICATIONS

Scott Bader Group Companies Crystic "Composites Handbook" 100 pages.
Kedward Keith and Whitney James Delaware Composites Design Encyclopedia "Design Studies" vol. 5 1990 preview version available at https:books.google.combooks?id=9-KYOm81MWEC&printsec=frontcover#v=onepage&q&f=false 17 pages.
Zweben Carl Handbook of Materials Selection "Chapter 12: Composite Materials" 2002 preview version available at https:books.google.combooks?id=gWg-rchM700C&printsec=frontcover#v=onepage&q&f=false 47 pages.
Johnson Truck Bodies Blizzard Series brochure accessed as early as Aug. 1, 2014 8 pages.
International Trucking Shows "True Composites Platform Highlight of International Trucking Show" Aug. 1992 1 page.
Composite Twisted Rudder TCC Meeting 2008 handout 32 pages.
Composite Marine Control Surface installed on USS Pioneer (MCM 9) May 1997 13 pages.
TrailerBody Builders "More Emphasis on Less Weight" available at http:trailer-bodybuilders.comtrailersmore-emphasis-less-weight May 1, 2008 5 pages.

* cited by examiner

COMPOSITE FLOOR STRUCTURE WITH EMBEDDED HARDPOINT CONNECTOR AND METHOD OF MAKING THE SAME

CROSS REFERENCE TO RELATED APPLICATION

This application claims priority to U.S. Provisional Patent Application Ser. No. 62/550,311, filed Aug. 25, 2017, the disclosure of which is hereby expressly incorporated by reference herein in its entirety.

FIELD OF THE DISCLOSURE

The present disclosure relates generally to floor structures and methods of making the same. More particularly, the present disclosure relates to composite floor structures with embedded hardpoint connectors for use in cargo vehicles and methods of making the same.

BACKGROUND OF THE DISCLOSURE

Cargo vehicles are used in the transportation industry for transporting many different types of cargo. Cargo vehicles may be constructed using composite materials, which may lead to an absence of or reduction in metallic and wood materials and associated advantages, including simplified construction, thermal efficiency, reduced water intrusion and corrosion, and improved fuel efficiency through weight reduction, for example. However, it is desired to strengthen connections between the composite materials and other vehicle components. For example, it is desired to strengthen a connection between a composite floor assembly and a coupler assembly of the cargo vehicle.

SUMMARY OF THE DISCLOSURE

A cargo vehicle is disclosed having a composite floor assembly with at least one embedded hardpoint connector. The embedded connector may be used to securely couple other vehicle components to the composite floor assembly, such as a coupler assembly with a king pin.

According to an exemplary embodiment of the present disclosure, a cargo body is provided including a composite floor assembly, a plurality of connectors embedded in the composite floor assembly, and a coupler assembly coupled to the plurality of connectors using a plurality of mechanical fasteners, the coupler assembly including a king pin that extends from the composite floor assembly to couple the cargo body to a vehicle.

According to another exemplary embodiment of the present disclosure, a cargo body of a vehicle is provided including a composite floor assembly including a plurality of beams, the plurality of beams including a subset of beams, and a plurality of connectors embedded in the subset of beams.

According to yet another exemplary embodiment of the present disclosure, a method is provided for manufacturing a composite floor assembly with at least one embedded connector. The method includes positioning at least one connector in an outer skin, introducing an expandable core material into the outer skin, expanding the core material around the at least one connector in the outer skin to form a composite beam with the at least one connector embedded therein, and arranging the composite beam with a plurality of additional composite beams to form a composite floor assembly.

Additional features and advantages of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Figure 1:
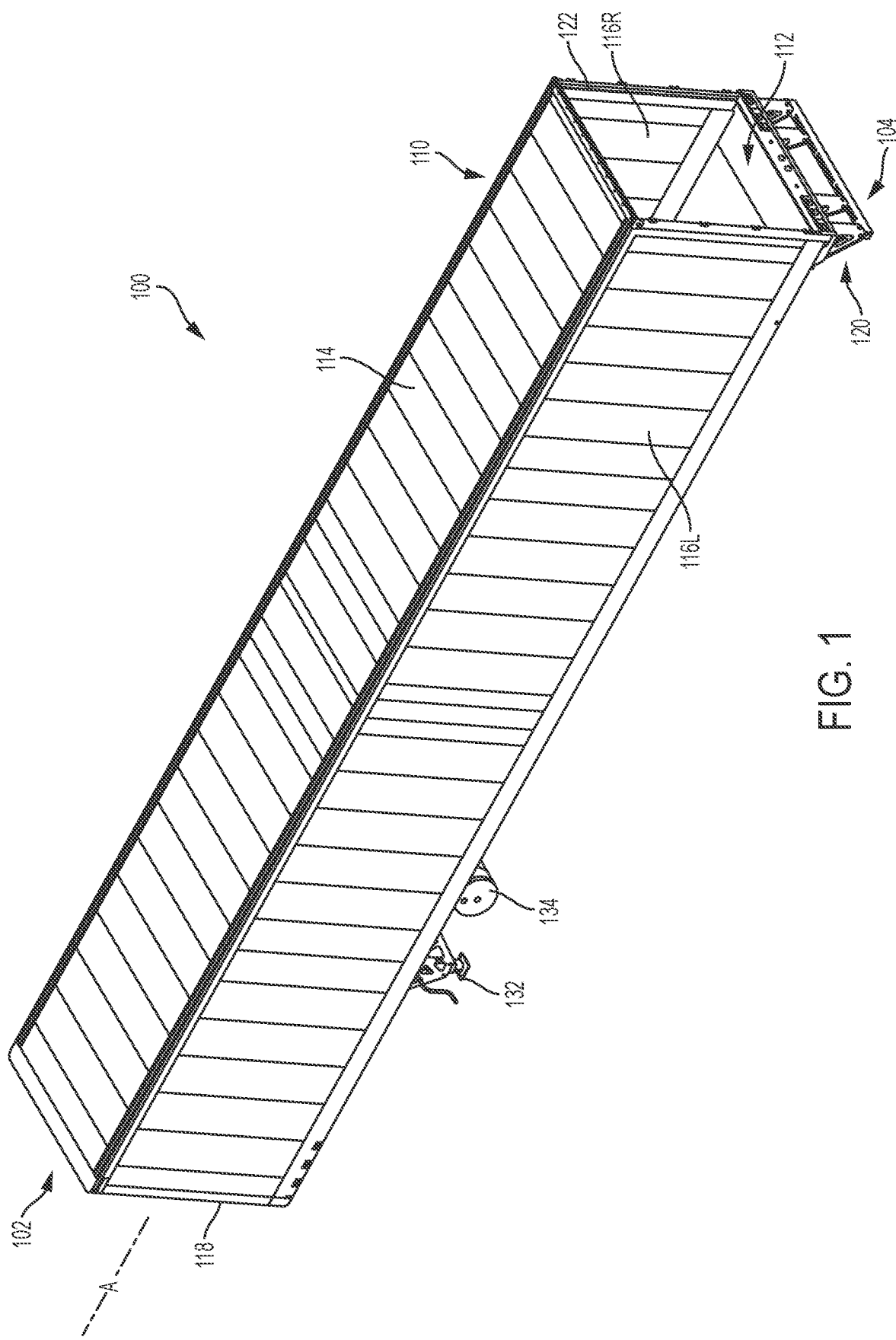
FIG. 1 is a top perspective view of an exemplary semi-trailer of the present disclosure including a composite floor assembly.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

1. Semi-Trailer

Referring initially to FIG. 1, a semi-trailer 100 is shown for supporting and transporting cargo. The illustrative trailer 100 extends along a longitudinal axis A from a front end 102 to a rear end 104. The illustrative trailer 100 includes a cargo body 110 with a floor assembly 112, a roof 114, a right sidewall 116R, a left sidewall 116L, a front wall or nose 118, and a rear door assembly 120 having a rear frame 122 and a door (not shown) to access the cargo body 110.

Moving from the front end 102 to the rear end 104, the trailer 100 also includes a coupler assembly 130 (FIG. 8) configured to couple the cargo body 110 to a motorized tractor or another vehicle (not shown), a landing gear assembly 132 configured to support the cargo body 110 on the ground, a fuel tank assembly 134, and a slide rail assembly (not shown) configured to couple the cargo body 110 to a rear wheel assembly (not shown). The front end 102 of the cargo body 110 may be supported atop the tractor (not shown) via the coupler assembly 130 in a transport condition or atop the landing gear assembly 132 in a stationary condition, and the rear end 104 of the cargo body 110 may be supported atop the wheel assembly (not shown).

In the illustrated embodiment of FIG. 1, cargo body 110 of trailer 100 is an enclosed body. The cargo body 110 may be refrigerated and/or insulated to transport temperature-sensitive cargo. While the concepts of this disclosure are described in relation to a refrigerated trailer 100, it will be understood that they are equally applicable to other vehicles generally, and more specifically to conventional trailers (e.g., dry freight trailers, flatbed trailers, commercial trailers, small personal trailers) and/or box or van semi-trailers, and the like. Accordingly, those skilled in the art will appreciate that the present invention may be implemented in a number of different applications and embodiments and is not specifically limited in its application to the particular embodiments depicted herein.

Trailer 100 may have various features in common with the vehicles shown and described in International Publication No. WO 2016/137974 and U.S. Publication No. 2017/0240217, the disclosures of which are expressly incorporated herein by reference in their entirety.

2. Composite Materials

The cargo body 110 of trailer 100 may be constructed, at least in part, of composite materials. For example, the floor assembly 112, roof 114, right sidewall 116R, left sidewall 116L, and/or nose 118 of cargo body 110 may be constructed of composite materials. As such, the floor assembly 112, roof 114, right sidewall 116R, left sidewall 116L, and/or nose 118 of cargo body 110 may be referred to herein as composite structures.

Composite materials are generally formed by combining two or more different constituents that remain separate and distinct in the final composite material. Exemplary composite materials for use in the composite cargo body 110 include fiber-reinforced plastics (FRP), for example carbon-fiber-reinforced plastics (CRP). Each composite structure may be a single, unitary component, which may be formed from a plurality of constituents or layers permanently coupled together. Other elements of the cargo body 110 may be constructed of non-composite (e.g., metallic) materials. For example, the rear door assembly 120 of the cargo body 110 may be constructed of metallic materials.

The composite construction of the cargo body 110 may present certain advantages. First, because the composite structures may lack structural metallic components, the composite cargo body 110 may have a reduced heat loss coefficient (Ua) and improved thermal efficiency. Also, the composite cargo body 110 may operate to minimize outgassing of blowing agents, minimize air loss, and minimize water intrusion. Additionally, the composite cargo body 110 may be lighter in weight than a typical metallic cargo body, which may improve fuel efficiency. Further, the composite cargo body 110 may have fewer metallic structures than a typical cargo body, which may make the cargo body 110 less susceptible to corrosion. Also, the composite cargo body 110 may include fewer parts than a typical metallic cargo body, which may simplify construction, reduce inventory, and reduce variation in manufacturing. Further, the composite cargo body 110 may be suitable for use with sensitive cargo, including foodstuffs, because the composite materials may be inert to avoid reacting with the cargo and other materials and because the composite materials may be easy to clean and maintain to ensure proper hygiene. As a result, the composite cargo body 110 may qualify as "food grade" equipment.

The composite structures of the present disclosure may contain one or more structural supports or preforms. The preform may have a structural core that has been covered with an outer fabric layer or skin. An exemplary preform 216L is described further below and shown in FIG. 6 and includes a core 250 and outer skins 252, 254. The outer skin may be stitched or otherwise coupled to the underlying core and/or any surrounding layers. The core may be extruded, pultruded, or otherwise formed into a desired shape and cut to a desired length. In an exemplary embodiment, the core is a polyurethane foam material or another foam material, and the outer skin is a non-woven spun bond polyester material, a fiberglass fabric, or another suitable material. Advantageously, in addition to its structural effect, the foam core may have an insulating effect in certain applications, including refrigerated trucking applications. Exemplary preforms include PRISMA® preforms provided by Compsys, Inc. of Melbourne, Fla.

Both the core and the outer skin of the preform may be selected to accommodate the needs of the particular application. For example, in areas of the final structure requiring more strength and/or insulation, a low-density foam may be replaced with a high-density foam or a hard plastic block. The individual preforms may also be sized, shaped, and arranged in a manner that accommodates the needs of the particular application. For example, in areas of the final structure requiring less strength, the preforms may be relatively large in size, with the foam cores spanning relatively large distances before reaching the surrounding outer skins. By contrast, in areas of the final structure requiring more strength, the preforms may be relatively small in size, with the foam cores spanning relatively small distances before reaching the surrounding outer skins. Stated differently, the preforms may be shaped as relatively wide panels in areas of the final structure requiring less strength and as relatively narrow support beams in areas of the final structure requiring more strength.

The composite structures of the present disclosure may also contain one or more reinforcing materials or layers around the preforms. Each reinforcing layer may contain reinforcing fibers and may be capable of being impregnated and/or coated with a resin, as discussed further in Section 3 below. Suitable fibers include carbon fibers, glass fibers, cellulose, or polymers, for example. The fibers may be present in fabric form, which may be mat, woven, non-woven, or chopped, for example. Exemplary reinforcing layers include chopped fiber fabrics, such as chopped strand mats (CSM), and continuous fiber fabrics, such as 0°/90° fiberglass fabrics, +45°/−45° fiberglass fabrics, +60°/−60° fiberglass fabrics, 0° warp unidirectional fiberglass fabrics, and other stitched fiber fabrics, for example. Such fabrics are commercially available from Vectorply Corporation of Phenix City, Ala. Exemplary fabrics include the E-LM 1810 fiberglass fabric with 0° unidirectional fibers, the E-LTM 3610 fiberglass fabric with 0°/90° fibers, and the E-LTM 2408 fiberglass fabric with 0°/90° fibers, for example.

According to an exemplary embodiment of the present disclosure, a plurality of different reinforcing layers may be stacked together and used in combination. For example, a chopped fiber fabric (e.g., CSM) may be positioned adjacent to a continuous fiber fabric. In this stacked arrangement, the chopped fibers may help support and maintain the adjacent continuous fibers in place, especially around corners or other transitions. Also, the chopped fibers may serve as a web to resist column-type loads in compression, while the adjacent continuous fibers may resist flange-type loads in compression. Adjacent reinforcing layers may be stitched or otherwise coupled together to simplify manufacturing, to ensure proper placement, and to prevent shifting and/or bunching.

3. Composite Molding Process

The composite structures of the present disclosure may be formed by a molding process, as discussed further below.

An exemplary molding process may involve fabricating one or more preforms. This step may involve providing a mold in a desired shape, covering interior surfaces of the mold with the outer skin material (e.g., fiberglass fabric), and injecting or otherwise introducing the core material (e.g., foam) into the mold. The core material may be allowed to expand in the mold and penetrate interstices of the surrounding outer skin material. Once solidified and/or cured, the preform may be removed from the mold. In certain embodiments, and as discussed further below, other elements (e.g., embedded connectors) may also be placed inside the mold and integrally molded with the preform.

Next, the exemplary molding process may involve fabricating the final composite structure from the preforms. This step may involve cutting the preforms to size, arranging the preforms and the reinforcing layers together in a mold resembling the final shape, wetting the materials with at least one resin and a catalyst to impregnate and/or coat the materials, and curing the materials to form a single, integral, laminated composite structure. After curing, the preforms may be extracted from the mold, which may be an open mold or a closed mold. In certain embodiments, and as discussed further below, other elements (e.g., outer panels) may also be placed inside the mold and integrally molded with the final composite structure.

The resin used to construct the composite structure may be a typical thermoset resin, a co-cure resin containing a plurality of individual co-curing resins which may be selectively distributed throughout the composite structure during the molding process, or a combination thereof. Such co-cure resins may comprise one or more elastomer components, such as urethane, co-cured with one or more resin components, such as a vinyl ester, epoxy, or unsaturated polyester components. Exemplary co-cure resins are disclosed in U.S. Pat. No. 9,371,468 and U.S. Publication No. 2016/0263873, the disclosures of which are hereby incorporated by reference in their entirety. As used herein, "co-cured" refers to the reactions involved in curing the elastomer components take place essentially concurrently with the reactions involved in curing the one or more resin components. In certain embodiments, areas of the composite structure that will be susceptible to high stress may receive a resin with a relatively higher polyurethane content for strength, whereas other areas of the composite structure that provide bulk and section modulus may receive a lower cost rigid, polyester-based resin, such as an isophthalic polyester resin.

Additional information regarding the construction of composite structures is disclosed in the following patents and published patent applications, each of which is incorporated by reference in its entirety herein: U.S. Pat. Nos. 5,429,066, 5,664,518, 5,800,749, 5,830,308, 5,897,818, 5,908,591, 6,004,492, 6,013,213, 6,206,669, 6,496,190, 6,497,190, 6,543,469, 6,723,273, 6,755,998, 6,869,561, 6,911,252, and 8,474,871, and U.S. Publication No. 2014/0262011.

4. Composite Floor Assembly

Front end 102 of floor assembly 112 is shown in more detail in FIGS. 2-6. The illustrative floor assembly 112 includes a lower surface 200 (FIG. 2) that faces downward toward the ground when in use. The illustrative floor assembly 112 also includes an upper surface or platform 202 (FIG. 4) that faces upward when in use to support cargo or other objects. The illustrative floor assembly 112 has a generally rectangular outer perimeter 204 with a width W, a length L, and a height H, although this shape may vary, and an inner portion 206. As discussed in Sections 2 and 3 above, floor assembly 112 may be a composite structure that is constructed, at least in part, of composite materials.

Figure 4:
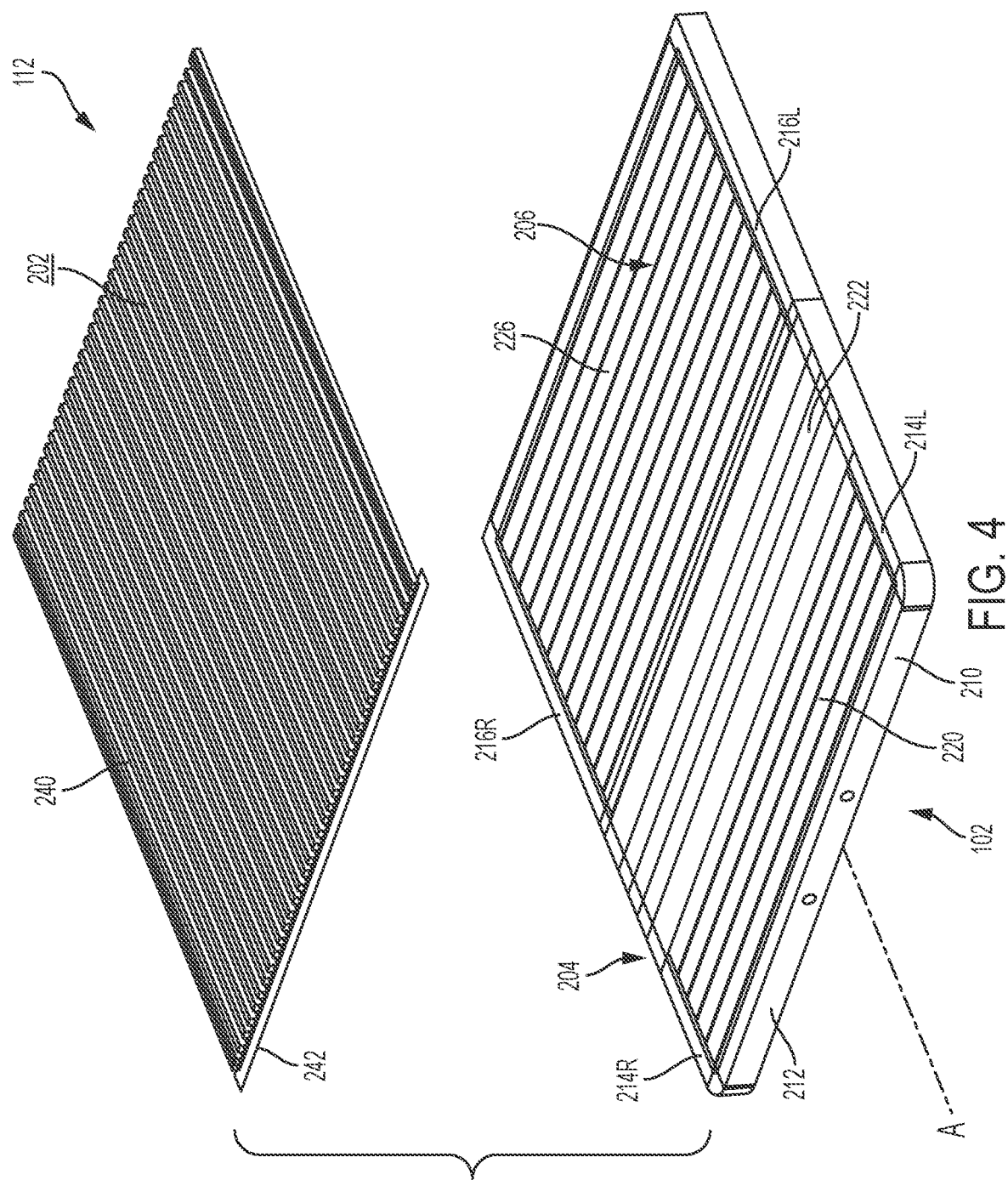
FIG. 4 is a partially exploded, top perspective view of the composite floor assembly of FIG. 2.
Figure 5:
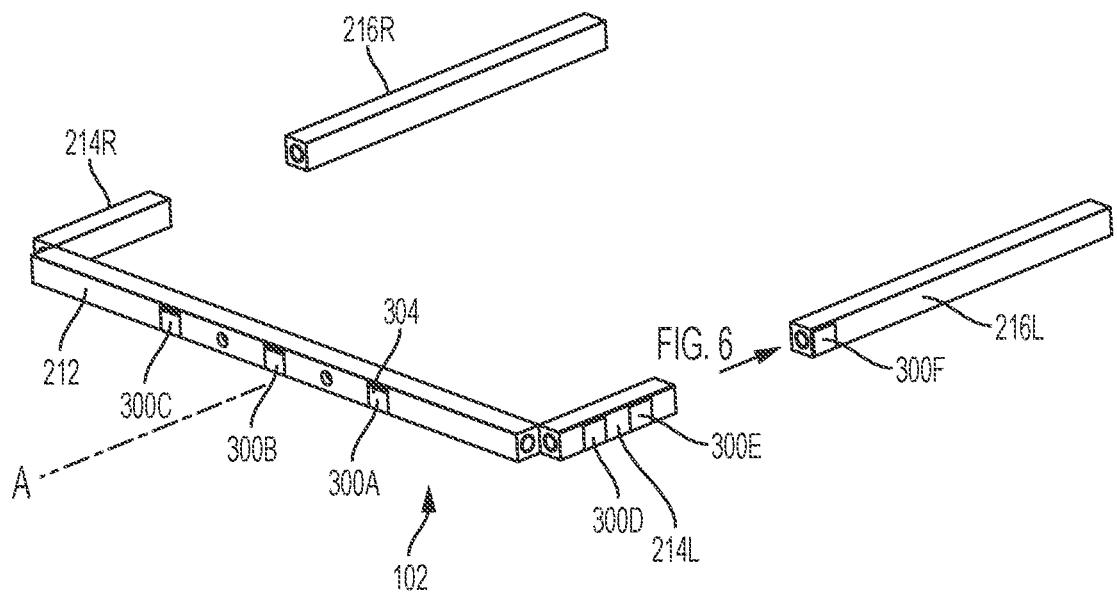
FIG. 5 is a perspective view of composite beams with embedded connectors used to form the composite floor assembly of FIG. 4.

As shown in FIGS. 4 and 5, the outer perimeter 204 of the illustrative floor assembly 112 includes an outer composite skirt 210 and a plurality of composite beams, specifically: a front transverse beam 212; a right front longitudinal beam 214R; a left front longitudinal beam 214L; a right rear longitudinal beam 216R; and a left rear longitudinal beam 216L. The front transverse beam 212 extends in a direction perpendicular to longitudinal axis A, whereas the longitudinal beams 214R, 214L, 216R, 216L extend in a direction parallel to longitudinal axis A. The individual composite beams 212, 214R, 214L, 216R, 216L may be constructed in accordance with Sections 2 and 3 above.

Figure 2:
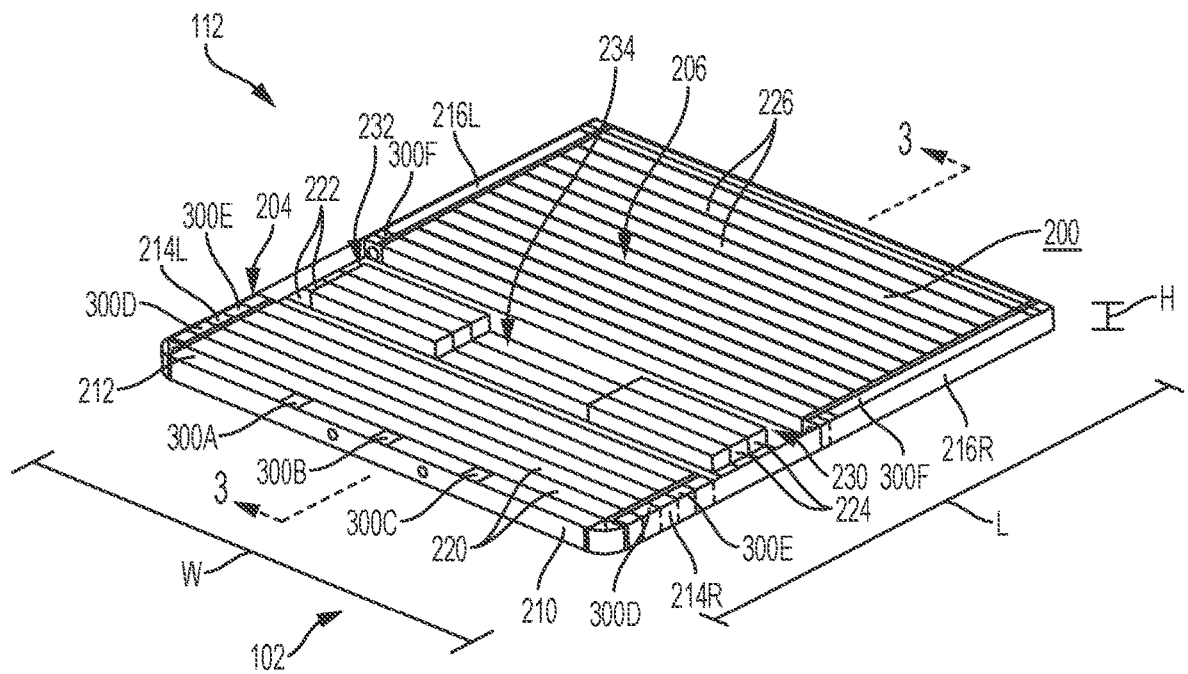
FIG. 2 is a bottom perspective view of a front end of the composite floor assembly of FIG. 1.
Figure 3:
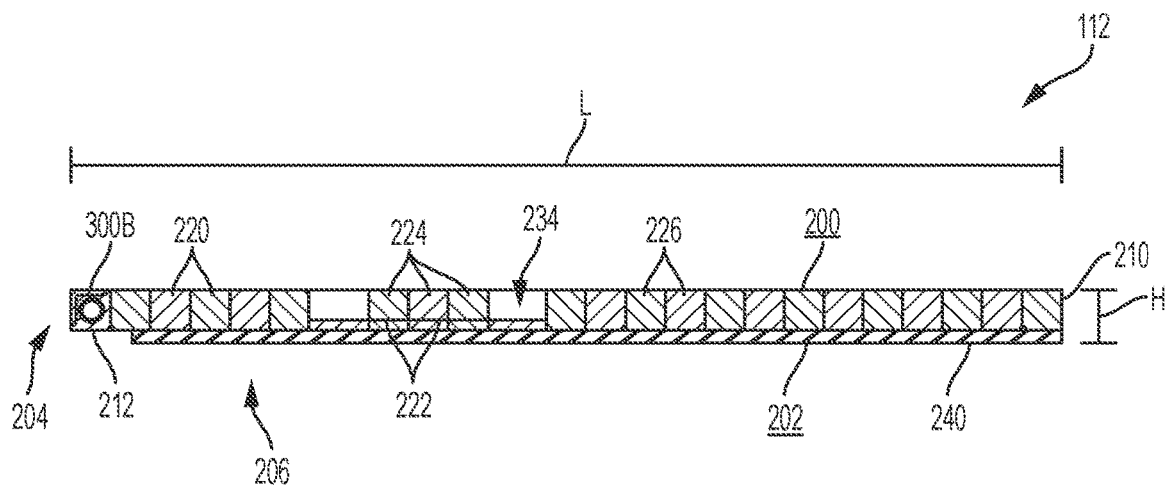
FIG. 3 is a cross-sectional view of the composite floor assembly of FIG. 2.

As shown in FIGS. 2 and 3, the inner portion 206 of the illustrative floor assembly 112 includes a plurality of composite beams, specifically: a first plurality of transverse beams 220; a second plurality of relatively thin transverse beams 222; a third plurality of relatively thin and short transverse beams 224 stacked beneath the second transverse beams 222; and a fourth plurality of transverse beams 226, all of which extend in a direction perpendicular to longitudinal axis A. The first transverse beams 220 and fourth transverse beams 226 span substantially the entire width W and height H of floor assembly 112. When stacked together, the second transverse beams 222 and third transverse beams 224 span substantially the entire height H of floor assembly 112, with the second transverse beams 222 being even thinner than the third transverse beams 224. However, the relatively short third transverse beams 224 do not span the entire width W of floor assembly 112 and are instead spaced apart from outer skirt 210 near outer perimeter 204 and from each other along longitudinal axis A. The individual composite beams 220, 222, 224, 226 may be constructed in accordance with Sections 2 and 3 above.

As discussed in Section 2 above, the individual composite beams 212, 214R, 214L, 216R, 216L, 220, 222, 224, 226 may be sized, shaped, and arranged in a manner that accommodates the needs of the particular application. For example, a relatively large number of small, closely-spaced beams 212, 214R, 214L, 216R, 216L, 220, 222, 224, 226 may be used for high-weight/high-strength applications, whereas a relatively small number of large and/or spaced-apart beams 212, 214R, 214L, 216R, 216L, 220, 222, 224, 226 may be used for low-weight/low-strength applications.

Referring still to FIG. 2, the illustrative floor assembly 112 also includes a recess 230 defined by the third transverse beams 224. Recess 230 includes a generally rectangular outer recess portion 232 that extends around the third transverse beams 224, including alongside the outer skirt 210, behind the first transverse beams 220, and in front of the fourth transverse beams 226. Recess 230 also includes a longitudinal inner recess portion 234 that extends between the spaced-apart third transverse beams 224 along longitudinal axis A.

As shown in FIG. 4, the illustrative floor assembly 112 further includes an upper panel 240 that defines upper surface 202. The upper panel 240 shown in FIG. 4 is a metallic (e.g., extruded aluminum or stainless steel) panel that provides strength, protection, and slip-resistance to the underlying elements of floor assembly 112, but it is also within the scope of the present disclosure for the upper panel 240 to be a resin, gelcoat, polymer, wood, or pultrusion layer, for example. The illustrative floor assembly 112 also includes a front gutter plate 242. The upper panel 240 and/or front gutter plate 242 may be integrally molded with or otherwise coupled to the underlying elements of floor assembly 112, as discussed in Section 3 above. An exemplary method for attaching upper panel 240 and/or front gutter plate 242 during the molding process is disclosed in U.S. Publication No. 2017/0239916, the disclosure of which is hereby expressly incorporated by reference herein in its entirety.

More information regarding floor assembly 112 may be found in U.S. Publication No. 2017/0241134, and U.S. patent application Ser. No. 16/100,276, filed Aug. 10, 2018, and titled "TRANSVERSE BEAM FOR COMPOSITE FLOOR STRUCTURE AND METHOD OF MAKING THE SAME," the disclosures of which are expressly incorporated herein by reference in their entirety.

5. Embedded Hardpoint Connectors

Figure 6:
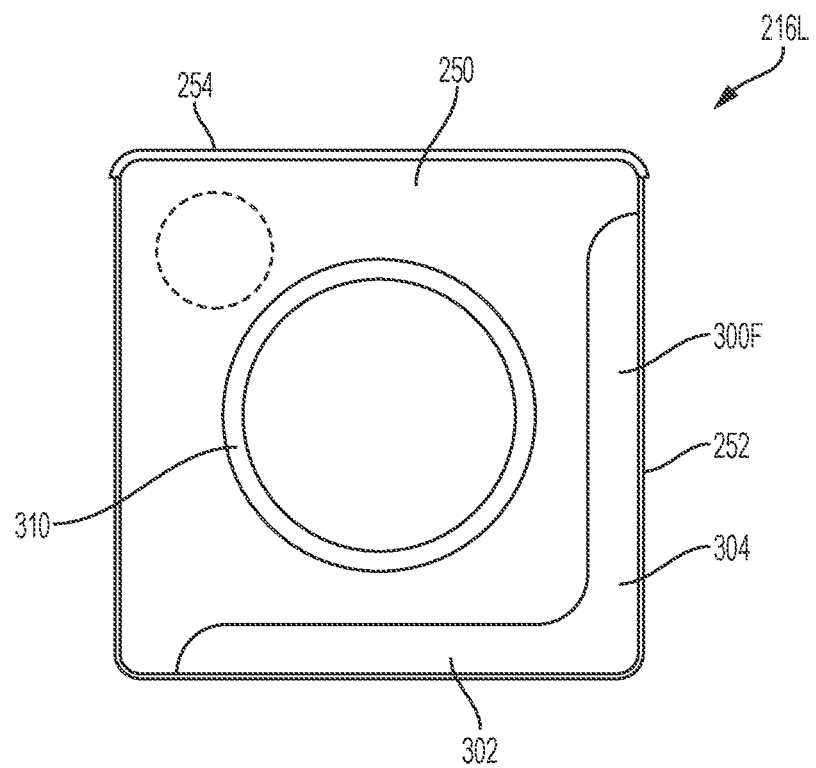
FIG. 6 is an end view of one of the composite beams of FIG. 5.

Floor assembly 112 may include one or more embedded hardpoint connectors 300, as shown in FIGS. 5 and 6. Connectors 300 may serve as fasteners or anchors for mechanically coupling other components of trailer 100 to floor assembly 112, such as rear door assembly 120 (FIG. 1), coupler assembly 130 (FIG. 8), landing gear assembly 132 (FIG. 1), fuel tank assembly 134 (FIG. 1), slide rail assembly (not shown), or a suspension assembly (not shown), for example. Each connector 300 may be configured to receive one or more mechanical fasteners 301 (FIG. 9) from the adjacent component. Suitable mechanical fasteners 301 include bolts, screws, rivets, and nails, for example. In certain embodiments, connectors 300 may include pre-tapped holes (not shown) capable of receiving the mechanical fasteners 301. Depending on the needs of the particular application, mechanical fasteners 301 may be used alone or in combination with structural adhesives. Mechanical fasteners 301 may be desired when connector 300 will be susceptible to peeling, whereas structural adhesive may be desired when connector 300 will be susceptible to shear loads. When used alone, the mechanical fasteners 301 may facilitate efficient and inexpensive assembly and repairs of trailer 100. When used in combination, the mechanical fasteners 301 may also serve as clamps to stabilize trailer 100 during curing of the structural adhesive.

Connectors 300 may be embedded in a select subset of beams 212, 214R, 214L, 216R, 216L, 220, 222, 224, 226. In the illustrated embodiment of FIG. 5, the front transverse beam 212 includes three spaced-apart connectors 300A-C arranged perpendicular to the longitudinal axis A, each of the front longitudinal beams 214R, 214L includes two spaced-apart connectors 300D-E arranged parallel to the longitudinal axis A, and each of the rear longitudinal beams 216R, 216L includes at least one connector 300F, for a total of nine connectors 300. The remaining beams 220, 222, 224, 226 illustratively lack embedded connectors 300. However, the connectors 300 may vary in number and position. Each illustrative connector 300 is an L-shaped bracket having a lower arm 302 positioned along lower surface 200 of floor assembly 112 and an outer arm 304 positioned along outer perimeter 204 of floor assembly 112. However, connectors 300 may also be C-shaped, T-shaped, pi-shaped, flat, bent, tubular, or other suitable shapes.

Connectors 300 may be constructed of metallic materials (e.g., steel, aluminum, titanium), polymeric materials, wood, or composite materials. In certain embodiments, connectors 300 are constructed of materials which are dissimilar from the composite material used to construct the corresponding beams 212, 214R, 214L, 216R, 216L. Connectors 300 may be fabricated by extrusion, pultrusion, sheet forming, roll forming, and/or casting, for example. Connectors 300 may also be single-piece or multi-piece constructs. For multi-piece constructs, the pieces may be welded, mechanically fastened, adhered, snap-fit, or otherwise coupled together.

The left rear longitudinal beam 216L and its corresponding connector 300F are shown in FIG. 6 and described below, but it is understood that this description may apply to other elements of floor assembly 112, including beams 212, 214R, 214L, 216R, and other connectors 300A-E. The illustrative beam 216L includes a core 250 (e.g., foam), a first outer skin 252 (e.g., fiberglass fabric), and a second outer skin or cap 254 (e.g., fiberglass fabric), wherein the outer skins 252, 254 cooperate to surround core 250. Lower arm 302 and outer arm 304 of connector 300F are embedded in core 250, such that the outer skins 252, 254 also cooperate to surround connector 300F.

Figure 7:
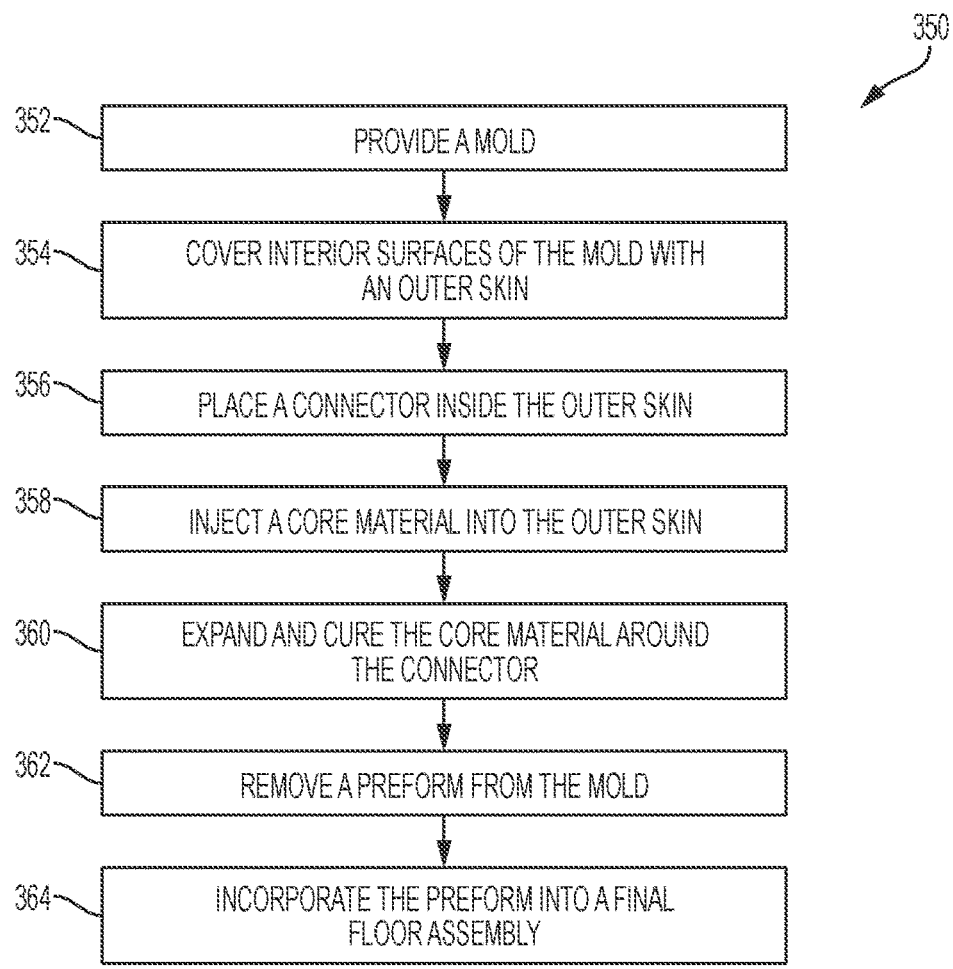
FIG. 7 is a flow chart of an exemplary method for manufacturing the composite floor assembly of the present disclosure.

Referring next to FIG. 7, an exemplary method 350 is provided for embedding connector 300F in the illustrative beam 216L (FIG. 6). The illustrative method 350 involves fabricating beam 216L as a preform and then incorporating the preform into the final floor assembly 112. At step 352, a mold having a desired shape is provided. At step 354, interior surfaces of the mold are covered with the outer skins 252, 254. At step 356, connector 300F (as well as any other connectors in beam 216L) is placed inside the outer skins 252, 254 in the mold. At step 358, the expandable core material 250 is injected or otherwise introduced into the outer skins 252, 254 to contact connector 300F. At step 360, the core material 250 expands and cures around connector 300F, which holds connector 300F in place. At step 362, a preform resembling beam 216L is removed from the mold. At step 364, the preform is incorporated into the final floor assembly 112, which may involve selectively arranging the preform with other preforms (e.g., other beams 212, 214R, 214L, 216R, 220, 222, 224, 226) and reinforcing layers, wetting the materials with at least one resin and a catalyst to impregnate and/or coat the materials, and curing the materials to form the final floor assembly 112. Additional details regarding method 350 may be provided in Section 3 above.

Returning to FIG. 6, the illustrative beam 216L also includes an embedded conduit 310 (e.g., PVC pipe). The illustrative conduit 310 is circular in cross-section, but this shape may vary. Conduit 310 may be embedded in core 250 of beam 216L in the same manner and at the same time as the above-described connector 300F. Similar conduits 310 may extend through other elements of floor assembly 112, including beams 212, 214R, 214L, 216R. In use, the adjacent conduits 310 may cooperate with one another to accommodate electrical wiring, air lines, fuel lines, or other equipment in floor assembly 112.

6. Coupler Assembly

Referring next to FIGS. 8-11, an exemplary coupler assembly 130 is provided for use with floor assembly 112. As discussed above with respect to FIG. 1, coupler assembly 130 may be used to couple cargo body 110 to a motorized tractor (not shown).

The illustrative coupler assembly 130 includes a substantially flat lower surface 400 (FIG. 10) that faces downward when in use and an upper surface 402 (FIG. 11) that faces upward toward lower surface 200 of floor assembly 112. The illustrative coupler assembly 130 also includes an approach plate subassembly 410, a grid plate subassembly 420, and a king pin subassembly 430, some or all of which may be metallic structures. Coupler assembly 130 may be a single-piece or a multi-piece construct. For multi-piece constructs, the pieces may be welded, mechanically fastened, adhered, snap-fit, or otherwise coupled together.

Figure 9:
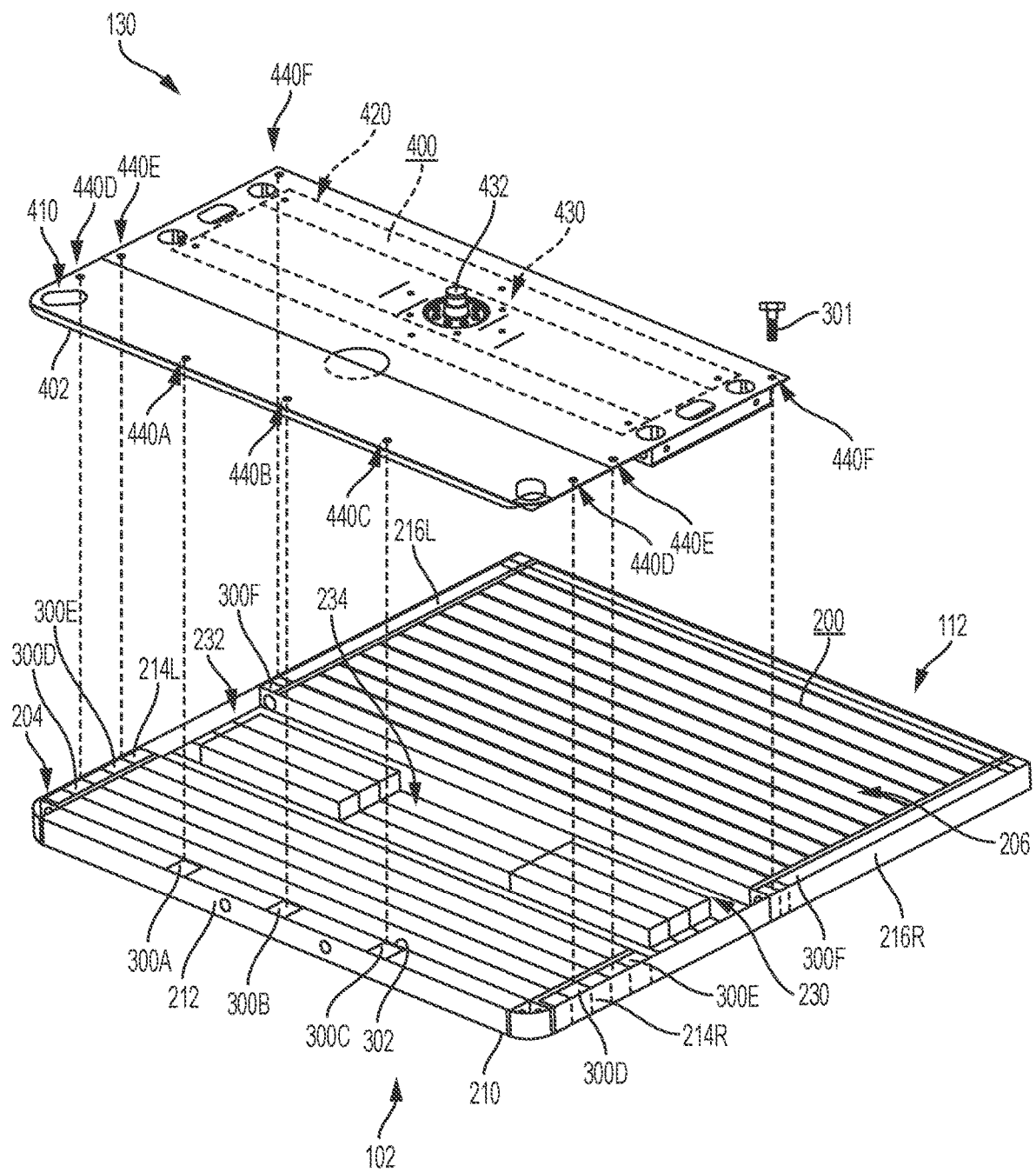
FIG. 9 is an exploded, bottom perspective view of the coupler assembly and the composite floor assembly of FIG. 8.
Figure 10:
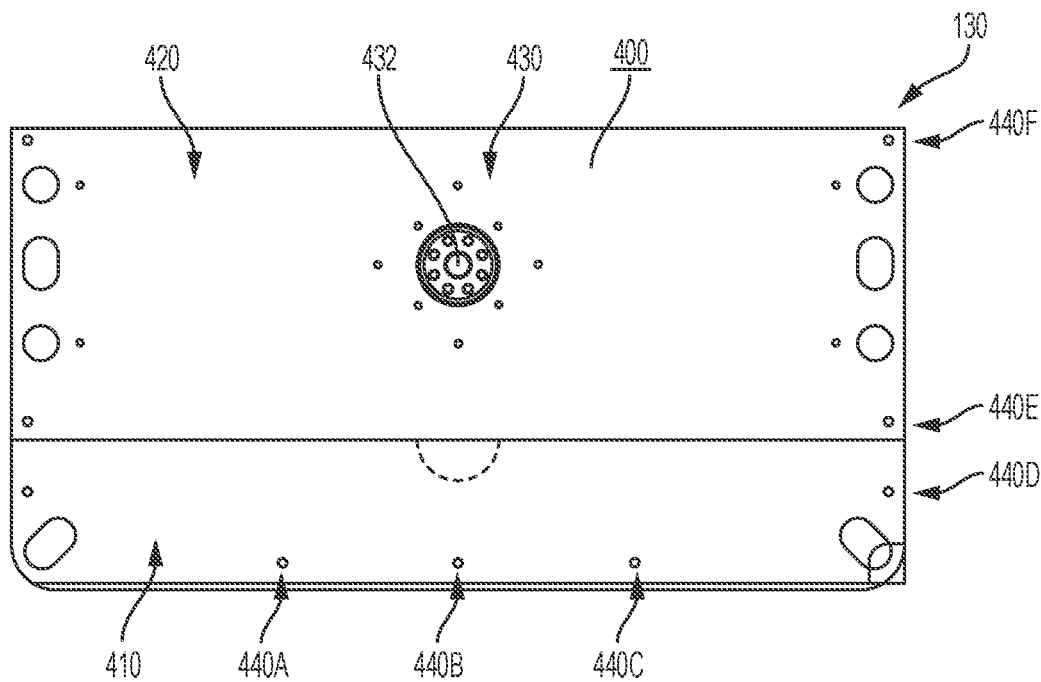
FIG. 10 is a bottom plan view of the coupler assembly of FIG. 8.
Figure 11:
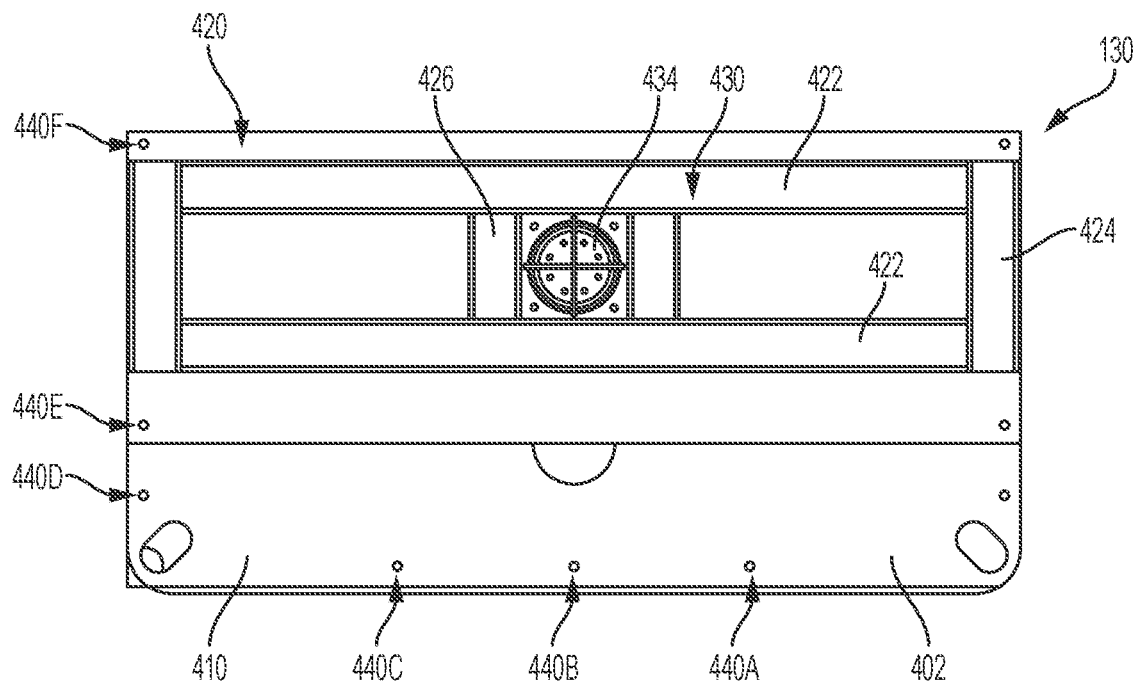
FIG. 11 is a top plan view of the coupler assembly of FIG. 8.

Grid plate subassembly 420 of the illustrative coupler assembly 130 is sized and shaped to mate with floor assembly 112. As shown in FIG. 11, upper surface 402 of grid plate subassembly 420 includes transverse frame members 422, outer longitudinal frame members 424, and inner longitudinal frame members 426. As shown in FIG. 9, transverse frame members 422 and outer longitudinal frame members 424 are arranged in a generally rectangular shape and sized for receipt in the generally rectangular outer recess portion 232 of floor assembly 112, and inner longitudinal frame members 426 are sized for receipt in the longitudinal inner recess portion 234 of floor assembly 112.

King pin subassembly 430 of the illustrative coupler assembly 130 includes a king pin 432 that extends vertically downward from lower surface 400 of coupler assembly 130 (FIG. 10) and a base 434 coupled to upper surface 402 of coupler assembly 130 (FIG. 11). King pin subassembly 430 may be mechanically fastened (e.g., bolted), adhered, or otherwise coupled to grid plate subassembly 420. Base 434 of king pin subassembly 430 may be supported by inner longitudinal frame members 426 of grid plate subassembly 420.

Coupler assembly 130 may be removably coupled to floor assembly 112 with a plurality of mechanical fasteners 301. More specifically, coupler assembly 130 may be removably coupled to the embedded connectors 300A-F in floor assembly 112 with a plurality of mechanical fasteners 301. In the illustrated embodiment of FIG. 9, coupler assembly 130 includes a plurality of apertures 440A-F, each being sized to receive a corresponding mechanical fastener 301 and being aligned with a corresponding connector 300A-F in floor assembly 112. In this way, the mechanical fasteners 301 may be inserted through apertures 440A-F in coupler assembly 130 and anchored into connectors 300A-F in floor assembly 112. As discussed in Section 5 above, structural adhesives may also be used in combination with the mechanical fasteners 301, which may make the connection between coupler assembly 130 and floor assembly 112 permanent.

Figure 8:
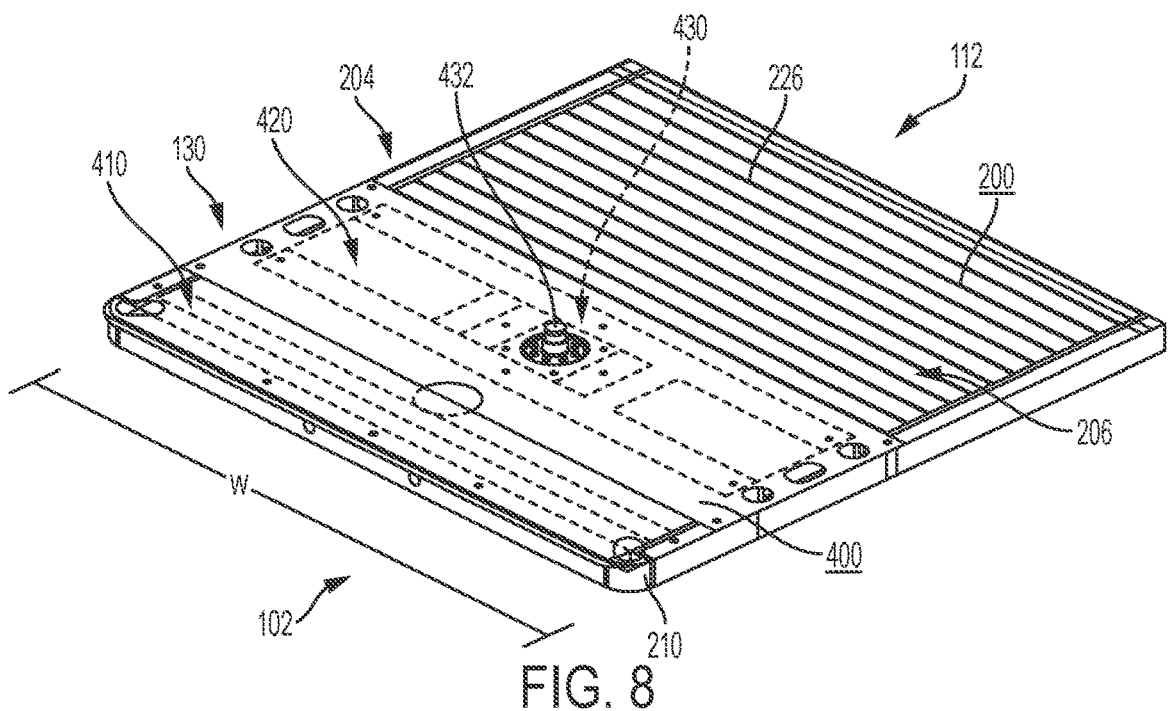
FIG. 8 is an assembled, bottom perspective view of a coupler assembly coupled to the composite floor assembly of FIG. 2.

When coupler assembly 130 is coupled to floor assembly 112, as shown in FIG. 8, coupler assembly 130 may be sized and shaped to extend across the width W of floor assembly 112. The approach plate subassembly 410 and the grid plate subassembly 420 may be substantially flush with lower surface 200 of floor assembly 112, while the king pin 432 of the king pin subassembly 430 may extend vertically downward from lower surface 200 of floor assembly 112 to engage the motorized tractor (not shown).

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A cargo body comprising:
    a composite floor assembly having an upper surface configured to support cargo and a lower surface opposite the upper surface;
    a plurality of connectors embedded in the lower surface of the composite floor assembly such that the plurality of connectors face downward; and
    a coupler assembly coupled to the plurality of connectors using a plurality of mechanical fasteners, the coupler assembly including a king pin that extends downward from the composite floor assembly to couple the cargo body to a vehicle.

2. The cargo body of claim 1, wherein the composite floor assembly comprises a plurality of beams each formed from a core material, an outer skin, and a resin, and wherein each of the plurality of connectors is embedded in the core material and surrounded by the outer skin of the corresponding beam.

3. The cargo body of claim 1, wherein:
    an inner portion of the composite floor assembly comprises a plurality of transverse beams that cooperate to define a recess; and
    the coupler assembly comprises a frame member sized for receipt in the recess of the composite floor assembly.

4. The cargo body of claim 1, wherein each of the plurality of connectors has a lower arm positioned along the lower surface of the composite floor assembly and an outer arm positioned along an outer perimeter of the composite floor assembly.

5. A cargo body comprising:
    a composite floor assembly, wherein an outer perimeter of the composite floor assembly comprises a plurality of longitudinal beams;
    a plurality of connectors embedded in the composite floor assembly, wherein each of the plurality of longitudinal beams includes at least one of the plurality of connectors; and
    a coupler assembly coupled to the plurality of connectors using a plurality of mechanical fasteners, the coupler assembly including a king pin that extends from the composite floor assembly to couple the cargo body to a vehicle.

6. The cargo body of claim 5, wherein each of the plurality of longitudinal beams further includes an embedded conduit.

7. A cargo body of a vehicle, the cargo body comprising:
    a composite floor assembly comprising a plurality of beams, the plurality of beams including a subset of beams, wherein the subset of beams includes:
        a front transverse beam including a plurality of embedded connectors arranged perpendicular to a longitudinal axis of the vehicle;
        at least one right longitudinal beam including a plurality of embedded connectors arranged parallel to the longitudinal axis of the vehicle; and
        at least one left longitudinal beam including a plurality of embedded connectors arranged parallel to the longitudinal axis of the vehicle.

8. The cargo body of claim 7, further comprising a coupler assembly with a grid plate sub assembly and a king pin subassembly, the grid plate subassembly being coupled to the plurality of connectors in the subset of beams.

9. The cargo body of claim 8, wherein the floor assembly defines a central recess that receives an inner frame member of the grid plate subassembly such that the king pin subassembly is aligned with the central recess.

10. The cargo body of claim 9, wherein the central recess is defined between a first plurality of transverse beams.

11. A cargo body of a vehicle, the cargo body comprising:
a coupler assembly with a grid plate subassembly and a king pin subassembly;
a composite floor assembly comprising:
a plurality of beams, the plurality of beams including a subset of beams, a first plurality of transverse beams, and a second plurality of transverse beams, wherein the first plurality of transverse beams is stacked upon the second plurality of transverse beams, the first plurality of transverse beams spanning a partial width of the floor assembly and the second plurality of transverse beams spanning substantially an entire width of the floor assembly; and
a central recess defined between the first plurality of transverse beams, the central recess receiving an inner frame member of the grid plate subassembly such that the king pin subassembly is aligned with the central recess; and
a plurality of connectors embedded in the subset of beams, the grid plate subassembly being coupled to the plurality of connectors in the subset of beams.

12. The cargo body of claim 11, wherein the first plurality of transverse beams is spaced apart from an outer perimeter of the floor assembly to define an outer recess that receives an outer frame member of the grid plate subassembly.

13. The cargo body of claim 11, wherein:
the grid plate subassembly is substantially flush with a lower surface of the floor assembly, and
the king pin subassembly extends vertically downward from the lower surface of the floor assembly.

* * * * *